Aug. 11, 1925.

S. J. CLULEE

CONSTRUCTION FOR EYEGLASSES

Filed Aug. 14, 1922

1,548,823

Inventor
Stephen J. Clulee
By his Attorney

Patented Aug. 11, 1925.

1,548,823

UNITED STATES PATENT OFFICE.

STEPHEN J. CLULEE, OF ATTLEBORO, MASSACHUSETTS, ASSIGNOR TO BAY STATE OPTICAL COMPANY, OF ATTLEBORO, MASSACHUSETTS, A CORPORATION OF MAINE.

CONSTRUCTION FOR EYEGLASSES.

Application filed August 14, 1922. Serial No. 581,667.

*To all whom it may concern:*

Be it known that I, STEPHEN J. CLULEE, a citizen of the United States, and a resident of Attleboro, in the county of Bristol and State of Massachusetts, have invented an Improvement in the Construction for Eyeglasses, of which the following is a specification.

This invention relates to construction for eyeglasses and, with regard to its more specific features, to means for supporting eyeglasses in position upon the wearer.

One of the objects thereof is to provide a construction of the above nature by means of which a pair of eyeglasses is supported in such a manner as to afford the wearer a high degree of comfort and ease. Another object is to provide a construction of the above nature, strong and reliable and thoroughly efficient in action. Another object is to provide a construction of the above nature which is capable of ready adjustment to varying conditions of practical use. Other objects will be in part obvious or in part pointed out hereinafter.

The invention accordingly consists in the features of construction, combinations of elements and arrangements of parts as will be exemplified in the structure to be hereinafter set forth and the scope of the application of which will be indicated in the following claims.

In the accompanying drawing in which is shown one of the various possible embodiments of this invention, Figure 1 shows a pair of eyeglasses in operative position;

Figure 1:
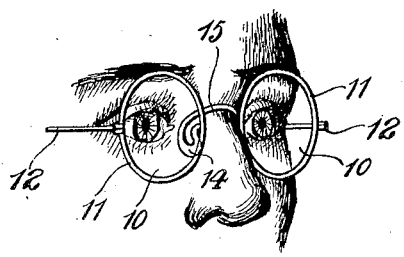

Referring now to the drawing in detail and first to Fig. 1, there is shown a pair of eyeglasses in position before the eyes of the wearer. The lenses 10 may be supported, for example, in a pair of rims 11, and a pair of temple bars as 12 may be employed to hold the eyeglasses in position and to prevent their sliding forward away from the eyes. As conducive to clearness of description and in order to avoid confusion, it may be here noted that the terms "forwardly" and "rearwardly" will be employed throughout to denote, respectively, directions away from and toward the eyes substantially along the line of vision; and "outwardly" and "inwardly" will be employed to denote, respectively, directions away from and toward the sides of the nose substantially at right angles to the line of vision.

Figure 2:
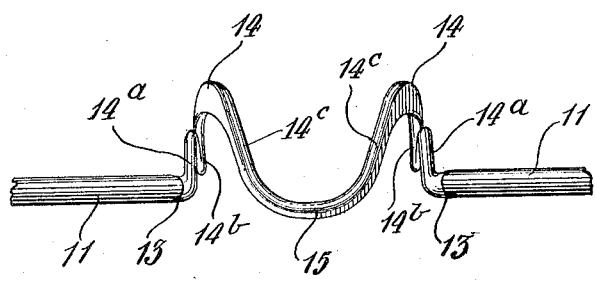
Figure 2 is a plan view in enlarged detail of the eyeglasses shown in Fig. 1, certain parts being cut away.
Figure 3:
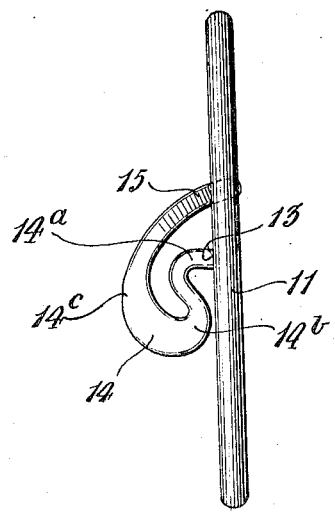
Figure 3 is a side elevation of the eyeglasses shown in Fig. 1.
Figure 4:
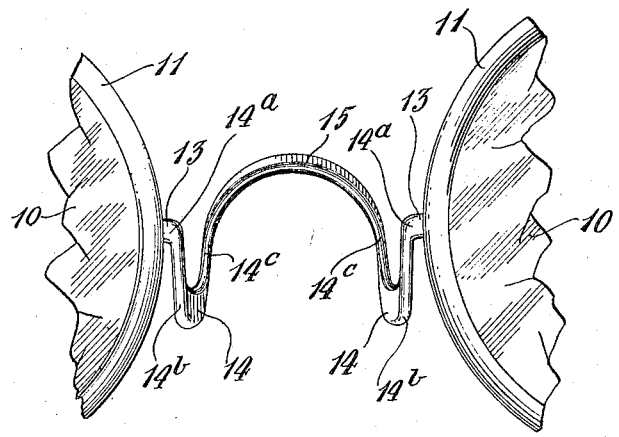
Figure 4 is a front elevation of the eyeglasses shown in Fig. 1.

Secured to the rims 11 as at 13 in any suitable manner or formed thereon are a pair of supporting members 14 formed and shaped to rest upon the sides of the nose and evenly distribute the weight of the eyeglasses thereon. The two supporting members 14 are connected by part 15 arching over the ridge of the nose as shown in Fig. 1, and these three parts, comprising what may be termed the bridge of the eyeglasses, are preferably formed of one piece of metal shaped to the desired contour. As clearly shown in Figs. 2, 3, and 4, the members 14 from the points 13 where they join the rims 11 are preferably extended rearwardly to a short distance as at $14^a$, thence downwardly and forwardly as at $14^b$, thence upwardly back upon themselves and inwardly and forwardly, as at $14^c$, to conform to the contour of the side of the nose and to form the arch portion 15. The shape of the parts 14 thus provides for a large bearing surface upon the sides of the nose and results in an even distribution of the weight of the eyeglasses thereon. The arch 15 may be shaped to rest lightly against the ridge of the nose, but it is preferable that substantially no weight be carried at this point, the supporting members 14 being shaped to carry the weight of the eyeglasses upon the side portions of the nose. The arch 15 is preferably made narrow and thus may be inconspicuous and light.

The advantages of thus evenly distributing the weight of a pair of eyeglasses and the additional comfort afforded the wearer by having the weight distributed over the side portions of the nose rather than having it bear directly upon the crest of the bridge of the nose are readily apparent. The supporting members 14 are inconspicuous being practically concealed from view, and the small connecting arch 15 presents a neat and attractive appearance. Furthermore, the large bearing surface of the parts 14 provides ample opportunity for heat radiation and is thus further conducive of greater comfort to the wearer.

If desired, the bridge may be so shaped that the parts 14 will tend to spring inwardly and grip the nose somewhat. Adjustments of any kind may be readily made to suit the requirements of the wearer; for example, the curve between the portions $14^a$ and $14^b$ provides for a vertical and tilting adjustment of the lenses. The curve between the parts $14^b$ and $14^c$ provides for adjustment forwardly and rearwardly, and also, by twisting, for adjusting the distance between the optical centers of the lenses. Also, the arch 15 may be shaped as desired to suit the width of the nose. The area of the sides of the nose over which the weight of the eyeglasses is distributed may be varied by changing the spacing between the parts $14^b$ and $14^c$. Thus by merely adjusting the twist and turns in the bridge, the eyeglasses may be correctly supported in a manner which affords a maximum degree of comfort and convenience.

It will thus seen that there is herein provided a device which embodies the various features of this invention, which device in its action attains the various objects of the invention and is well adapted to meet the requirements of practical use.

As various possible embodiments may be made of the above invention, and as many changes might be made in the embodiment above set forth, it is to be understood that all matter hereinbefore set forth or shown in the accompanying drawing is to be interpreted as illustrative and not in a limiting sense.

I claim as my invention.

1. In eyeglass construction, in combination, an eyeglass lens and a member connected thereto extending rearwardly therefrom, thence directly downwardly and forwardly and thence curved rearwardly and upwardly providing a loop constituting a supporting member adapted to rest upon the side portion of the nose.

2. In eyeglass construction, in combination, an eyeglass lens, and a member connected thereto extending rearwardly therefrom, thence directly downwardly and forwardly, thence rearwardly and upwardly toward the ridge of the nose, said last two portions being flattened and forming a loop adapted to rest upon the side of the nose to support the eyeglasses.

3. In eyeglass construction, in combination, a pair of eyeglass lenses, a member arching over the ridge of the nose, thence extending on either side downwardly and rearwardly, thence forwardly, thence upwardly and rearwardly forming a pair of loops adapted to rest upon the sides of the nose, and thence directly forwardly to said eyeglass lenses to which its ends are secured.

4. In eyeglass construction, in combination, a pair of eyeglass lenses, a member arching over the ridge of the nose, thence extending on either side downwardly and rearwardly thence forwardly, thence upwardly and rearwardly, said last three portions being flattened and widened and adapted to rest upon the sides of the nose to support the eyeglasses, and thence directly forwardly to said eyeglass lenses to which they are secured.

In testimony whereof, I have signed my name to this specification this 3rd day of August, 1922.

STEPHEN J. CLULEE.